Figure 1:
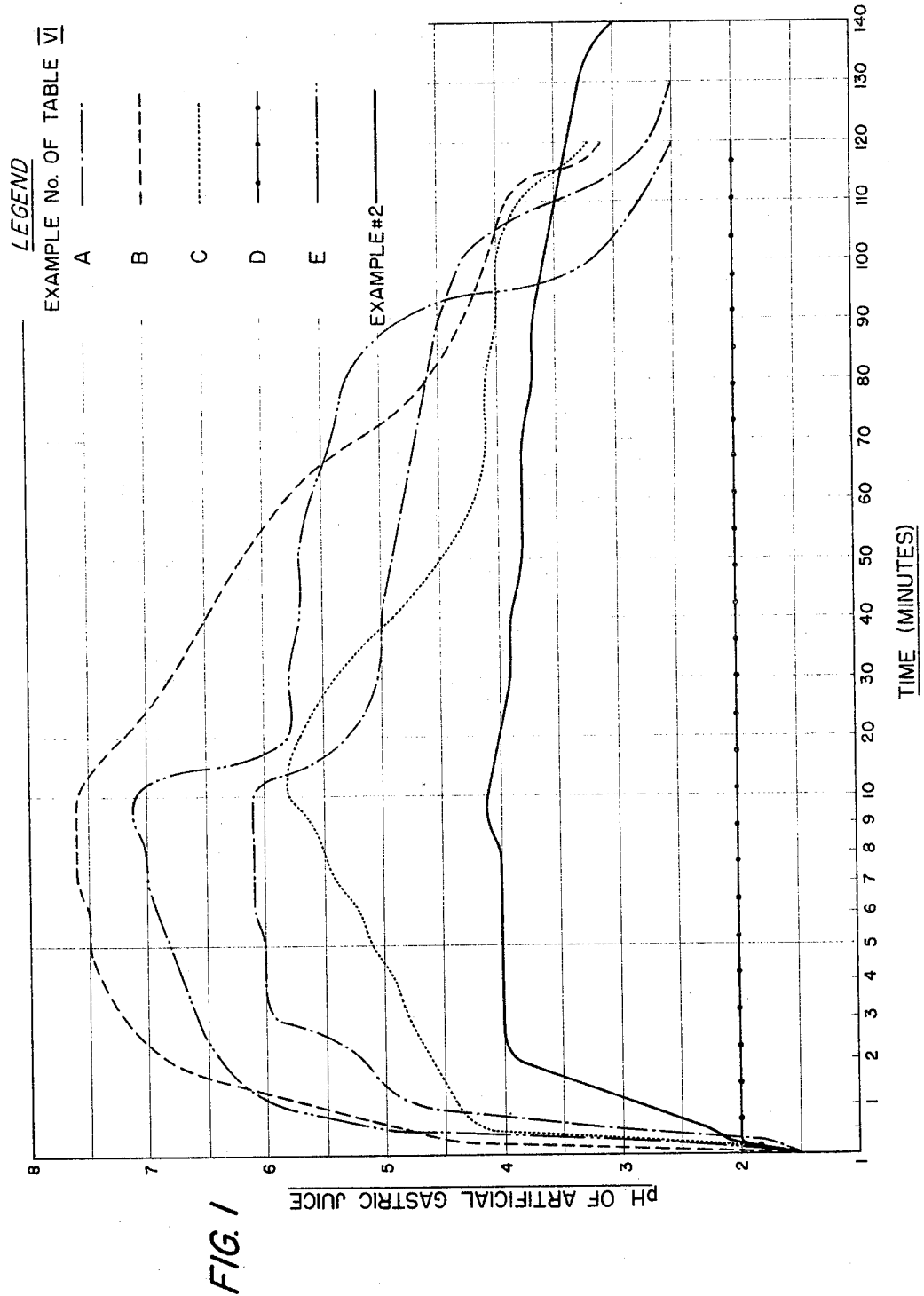

United States Patent Office 3,272,703
Patented Sept. 13, 1966

3,272,703
ANTACID COMPOSITION AND PROCESS OF
MAKING THE SAME
Andrew M. Rubino, New Providence, and James J. Martin, Jr., Old Bridge, N.J., and John E. Garizio, Garden City, N.Y., assignors, by mesne assignments, to Armour Pharmaceutical Company, Chicago, Ill., a corporation of Delaware
Filed Oct. 25, 1962, Ser. No. 233,010
21 Claims. (Cl. 167—55)

This invention relates to an antacid composition, and more particularly to magnesium and/or calcium aluminum hydroxy carbonate coprecipitates, and to a process for preparing the same. The antacids prepared in accordance with this invention have a surprisingly rapid, constant, unvarying, and sustained buffering capacity against acids, such as hydrochloric acid, being capable of stabilizing pH within the range from 3 to 5 for at least one hour. The antacids of this invention are of great value in combatting stomach hyperacidity.

Antacid preparations are now quite generally employed for the treatment of peptic ulcers, gastric hyperacidity and dyspepsia. Gwilt, Livingstone and Robertson in the Journal of Pharmacy and Pharmacology, X No. 12, 770–775 (1958), describe the characteristics of an ideal antacid. They point out that it should show its maximum neutralizing effect in the shortest possible time, that it should neutralize an adequate amount of gastric hydrochloric acid and maintain its action during the normal period of gastric digestion, that any excess however great beyond the amount required to neutralize free gastric acid should not cause alkalization, that it should raise the pH of the gastric contents to a level at which pepsin activity is reduced significantly but not totally inhibited, that adequate and repeated doses should be palatable to the hyperacid patent, and that its use should not lead to laxative, constipating or other side effects such as gastric irritation. In addition to these factors the antacid composition should be inexpensive and it should not deteriorate significantly in any respect on aging. These workers summarize the various statements in the literature as to the pH ranges desirable for the ideal antacid, and conclude that a pH within the range from about 3 to about 5 is apparently the optimum to ensure adequate relief from hyperacidity, particularly if an ulcer site is present, and at the same time permits sufficient residual pepsin activity to avoid secondary digestive disturbances.

Modern therapeutic practice has thus abandoned the administration of excessive quantities of strong antacids, such as sodium bicarbonate, in favor of acid buffers, such as aluminum hydroxide, in order to control the gastric acidity at physiologically more desirable levels, thus minimizing the further secretion of stomach acids and avoiding the risk of alkalosis. It is thus one of the purposes of this invention to avoid an excessive initial increase in the pH of the gastric juices while providing an antacid of constant and sustained activity.

Edwards in The Chemist and Druggist, December 14, 1957, page 647, also discusses the properties of an ideal antacid, and suggests that the nearest approach to the ideal attained as of that date was wet activated alumina gel. Dr. Edwards' views on the properties of the ideal antacid are in substantial agreement with those expressed by Gwilt et al.

Liquid aluminum hydroxide gel closely approaches the ideal for an antacid, but its liquid form makes it inconvenient to use, especially in the case of ambulatory patients. The liquid gel is quite rapid in its action and gives a prolonged antacid effect in the optimum pH range. It is not significantly affected in its antacid properties by pepsin, and it also does not significantly lose its antacid characteristics in aging. However, as Edwards and others have pointed out, it may have a mildly constipating effect, which many have sought to remedy by combining it with other ingredients such as magnesium hydroxide or carbonate.

The advantages of the dried gel are obvious. However, the obvious material, dried aluminum hydroxide gel, is actually far from an ideal antacid. It exhibits an undesirable lag in its rate of reaction with stomach acids. It does not give a prolonged antacid effect in the optimum pH range, and its antacid properties are severely affected by pepsin. Also, its antacid activity is less than that of the liquid gel, being decreased by the drying and the reduced activity decreases further with aging. These disadvantages have been noted by Gwilt et al. and other workers in this field.

In order to surmount the disadvantages inherent in the use of aluminum hydroxide as an antacid, various mixtures thereof with other bases and basic salts have been tried by those skilled in the art, so as to achieve a sustained buffering action within the desired pH range. Among such mixtures has been that described by Loewig German Patent No. 70,175, who adds slowly a solution of an alkali metal aluminate to a solution containing an excess of magnesium bicarbonate, obtaining aluminum hydroxide gel and magnesium carbonate in a composition he gives as $Al_2H_6O_6MgCO_3$, which is washed, dried and powdered. The product contains approximately equal molar proportions of aluminum and magnesium, calculated as the oxides. However, this product is rather slow reacting, not different in this respect from dried aluminum hydroxide gel.

Beekman U.S. Patent No. 2,797,978 showed that the product obtained by precipitating magnesium carbonate in the presence of aluminum hydroxy carbonate gel was superior to Loewig's in reaction velocity and in acid-consuming capacity. Beekman's product was identified as aluminum magnesium hydroxy carbonate, and is obtained by precipitation at a pH of about 8. It contains a relatively small amount of magnesium, from 5 to 25% Mg calculated as MgO for 150 parts of the total magnesium and aluminum oxides.

The Beekman aluminum magnesium hydroxy carbonate has in fact established a high standard of antacid effectiveness, not equaled by other proposed combinations. The composition is far superior to dry blends of aluminum hydroxide and magnesium carbonate, which cannot maintain pH within the optimum range of 3 to 5 for more than about one-half hour. However, in the wet gel or suspension form, the product has a tendency to thicken or harden.

Schenk, Schweizerische Medizinische Wochenschrift, No. 51, pp. 1418–20 (1954), proposed a 3:1 mixture of Al(OH)$_3$ and Mg(OH)$_2$, which he showed was better than aluminum hydroxide gel alone. However, initially there is a high pH rise above 5, to 6 or 7, which is undesirable. The Beekman composition on the other hand, holds the pH at above 3 and never exceeding 4.5 for well over 2 hours.

Both U.S. Patent No. 2,880,136 and British Patent No. 745,493 coprecipitate aluminum hydroxide and one or both of magnesium and calcium carbonates at a pH of about 8.5. However, this coprecipitate also gives a rapid initial pH rise to more than 6, and the pH remains above the maximum of 5 for over an hour.

Schenck U.S. Patent No. 2,958,626 describes a process for making an antacid which involves reacting sodium aluminate with magnesium bicarbonate and carbon dioxide. The product of this reaction is the aluminum magnesium hydroxy carbonate of the Beekman patent. Analysis of the product obtained by the Schenk examples confirms that the product is amorphous, has no X-ray diffraction spectra, corresponds to a mixture of the above chemicals by infra red analysis, and has the same approximate Al$_2$O$_3$, MgO, Na$_2$O and CO$_2$ content, pH and acid-consuming capacity of the Beekman product. It acts as through it were the same antacid in the Holbert, Noble and Grote test.

Because it has a low magnesium oxide content, the Beekman aluminum magnesium hydroxy carbonate has a low or no cathartic activity. This is not advantageous, if cathartic activity is desired to overcome the constipating effect of the aluminum hydroxide gel. However, it has not heretofore been possible to prepare an antacid with a high magnesium oxide content that will not also give a rapid and too high initial pH, above the permissible 5, because of the high alkalinity of magnesium oxide. The Schenck Al(OH)$_3$—Mg(OH)$_2$ blend is an example of the effect of the magnesia. Mg(OH)$_2$—MgCO$_3$ systems also have a high pH; even a 1:3 blend has a pH of 10.4.

Another problem presented by previous antacid systems, and this is particularly true of those containing aluminum hydroxide gel, is a tendency to adsorb or occlude sodium and other foreign salts, the by-products of the reaction by which the antacid precipitates are formed. Even the Beekman product can contain as much as 2% sodium due to this effect. This poses a problem to users who must adhere to a low sodium or low salt diet.

Aqueous antacid gels and suspensions have presented the further difficulty of thickening and hardening during storage, and for this reason powder and like solid systems have been favored. Indeed, it has been possible to prepare a stable aqueous system only with the aid of adjuncts such as polyhydric alcohols (Alford U.S. Patent Nos. 2,755,220 and 2,999,790), and even these systems are not completely satisfactory. A system sufficiently stable in the absence of such adjuncts has not been available.

In accordance with the invention, an antacid composition is provided having an extraordinarily high content of magnesium, calculated as the oxide, but probably present as a complex carbonate, a very small foreign salt content, and a rapid effectiveness, remaining above a pH of 3 but without exceeding a pH of 5 for at least one hour and as much as two hours or more. Aqueous systems of this composition are extraordinarily stable against thickening and hardening. Calcium can be used in substitution for all or part of the magnesium, with equivalent antacid effectiveness.

The antacid of the invention can be described chemically as a magnesium and/or calcium aluminum hydroxy carbonate. However, this is not meant to imply that it is a single chemical compound, since the composition and structure are as yet unknown. The antacid is certainly not a mere mixture of aluminum hydroxide gel and magnesium or calcium carbonate, since it has none of the properties of such a mixture. Also, it is not a mixture of Ca(OH)$_2$, Mg(OH)$_2$ and Al(OH)$_3$, since the presence of CaO, MgO, Ca(OH)$_2$ or Mg(OH)$_2$ has not been detected, and its antacid activity is such as to indicate the absence of CaO, MgO, Ca(OH)$_2$ or Mg(OH)$_2$. The aluminum magnesium and/or calcium and carbonate and hydroxyl groups may be associated in some form of complex ion or coordination complex.

The antacid is completely characterizable as magnesium or calcium aluminum hydroxy carbonate, having a pH in a 2% aqueous slurry or suspension of from about 7 to about 9 and an Al$_2$O$_3$:MO molecular ratio of from 4:1 to 1:10, M representing magnesium and/or calcium.

These antacids are capable, as determined by the Holbert, Noble and Grote test procedure, of maintaining a pH in the stomach within the range from 3 to 5, and preferably from 3.5 to 4.5, for two hours and longer, and rapidly increase the pH to within this range without exceeding the maximum optimal pH of 5.

The intacid effectiveness of the antacids of the invention is determined by the method of Holbert, Noble and Grote, Journal of the American Pharmaceutical Association (scientic edition), 36, 149 (1947); 37, 292 (1948); 41, 361 (1952); as modified by Stewart M. Beekman, 49, 191 (1960). In this method, a test sample of antacid is added to 150 ml. of artifical gastric juice consisting of 0.0316 N hydrochloric acid containing 2 g. of pepsin. The artificial gastric juice is maintained at a temperature of 37.5° C. The test procedure is carried out by continuously introducing fresh artificial gastric juice, beginning with the tenth minute of the test period, and removing the antacid-gastric juice mixture by overflow at the rate of 2 ml. per minute. The antacid effect is determined by measuring the pH of the artificial gastric juice during the test period, which is two hours, or longer. This is the test procedure used in the examples.

Aluminum- and magnesium-containing antacids of the prior art have a pH of from 8 to 11, depending on the ratio of aluminum to magnesium. The high alkalinity of such antacids prepared in conventional fashion results in the undesirable initial pH increase to over 5, as previously described. However, the antacids of this invention in suspension in water having a pH of 7 to 9 do not give this effect. Due to the absence of this effect, the antacids of the invention can have an unusually high proportion of magnesium and/or calcium to aluminum.

The proportions of aluminum to magnesium or calcium are defined in terms of the molecular ratio of Al$_2$O$_3$:MO, where M is Mg or Ca, or a mixture thereof, i.e., Al$_2$O$_3$:MgO or Al$_2$O$_3$:CaO. The antacids of this invention, calculated as their equivalent oxides, can have a ratio within the range of from about 4:1 to about 1:10 without causing an undesirable rapid pH increase to above 5, following administration. There is no upper limit to the proportion of aluminum to calcium or magnesium, other than that imposed by the acid-neutralizing capacity and pH of the end product. A preferred relatively high magnesium to aluminum ratio which results in an antacid with a cathartic effect counteracting possible constipating effects due to aluminum hydroxide is about 5:8.

The antacids of the invention are prepared by coprecipitation from a common solution containing magnesium and/or calcium, aluminum, and hydroxide ions, and, optionally, carbon dioxide, or, if carbon dioxide is not present, followed by carbonation. These ions can be supplied by any means, provided the pH during coprecipitation in the absence of carbon dioxide is maintained within the range from about 9 to about 10, and in the presence of carbon dioxide, at a pH within the range from about 6 to about 10. After coprecipitation is complete, the pH ceases to be critical, and can be permitted to seek its own level. If carbon dioxide is absent, it may decrease, but usually, it will rise to about 10 to about 10.5, and this is advantageous in ensuring complete precipitation of magnesium.

The temperature of coprecipitation is not critical. Room temperature is conveniently employed and temperatures up to 65° C. have been used with good results. Higher temperatures can be used if the reaction time is correspondingly shortened.

After reaction is complete, the solution can be chilled to assist in completing precipitation. It can also be aged for a period of time, again to ensure complete precipitation, and also to complete complexing of the components to form the antacid of the invention. A coprecipitate that has been aged for one hour is superior in activity to one freshly coprecipitated, which, together with the change in pH during aging, suggests that although at first coprecipitation may be complete, the reactions responsible for forming the complex may not be.

Carbon dioxide is reacted with the coprecipitate, either simultaneously during its formation, if carbon dioxide is present at that time, or after coprecipitation has proceeded either partially or to completion, by addition of carbon dioxide after coprecipitation or after aging. If carbon dioxide is reacted therewith during coprecipitation or aging the pH is maintained within the range from about 6 to about 11. If the carbon dioxide is reacted therewith after aging, carbon dioxide is introduced into the reaction slurry until the pH of the slurry has been reduced to between about 6 and about 7.5.

The reaction with carbon dioxide usually requires one hour. Carbon dioxide gas is the source of carbon dioxide, but a solution of carbon dioxide in water can also be used. The carbon dioxide produces a coprecipitate with a reduced pH and no observable tendency to occlude foreign ions, such as sodium or sulfate ions. The antacid is then separated and washed with water to remove salts.

The product can be marketed as a wet gel or slurry, which does not thicken on aging, for use in the form of suspensions, or it can be spray dried, or vacuum filtered to a dry cake which is crushed to a powder. The powder may be marketed as such, or tabletted, using the customary excipients, for example, a polyol, a sweetener and a lubricant, such as mannitol, dextrose and magnesium stearate.

While various methods of bringing the aluminum, magnesium and/or calcium, and hydroxide ions together simultaneously so as to effect coprecipitation under the stated conditions will be apparent to those skilled in this art, it is presently preferred to mix a solution of an alkali metal aluminate, such as sodium or potassium aluminate, and a solution of a water-soluble calcium and/or magnesium salt, such as the chloride, bromide, iodide, or nitrate. The pH of these solutions is adjusted by dilute alkali, such as sodium or potassium hydroxide or carbonate, so as to maintain the pH during coprecipitation within the range from about 9 to about 10. If it is important that the antacid be free from sodium or potassium ion, sodium or potassium hydroxide should not be used with calcium-containing antacids, because of the strong tendency to form highly alkaline calcium coprecipitates. This does not occur with magnesium-containing antacids.

The two solutions, in the approximate stoichiometric proportions to give the desired antacid composition, are then mixed by blending with water, and then allowed to react to form the coprecipitate. The reaction forms as by-products the salts of the alkali metal of the aluminate and the anion of the magnesium and/or calcium salt. These are soluble, and do not precipitate. They are easily washed out of the coprecipitate, which shows no tendency to occlude such salts upon separation from the reaction mixture.

The following examples in the opinion of the inventors represent preferred embodiments of their invention.

Examples 1 to 6

An aluminum-magnesium-hydroxy-carbonate was prepared by dissolving 226.8 g. of sodium aluminate in 3460 g. of deionized water mixed with 380 g. of 50% sodium hydroxide solution, dissolving 856 g. of magnesium chloride hexahydrate in 4680 g. of deionized water, and then simultaneously adding these solutions to 4300 g. of deionized water at room temperature, at such a rate and in such proportions as to maintain the pH between 9.5 and 10. One hour was required to complete the reaction. At the completion of the simultaneous addition, the pH was 9.65, and a gelatinous white precipitate had formed.

The slurry was aged for one hour, under continuous agitation. During this time, the pH of the slurry decreased to 9.5. 250 g. of carbon dioxide was then bubbled through the slurry water under continued agitation at room temperature for ninety minutes, during which the pH decreased to 6.1.

The slurry was allowed to stand for about two hours, filtered, and the filter cake repeatedly washed with deionized water to remove sodium and chloride ions. 1863 g. of compressed gel was obtained in paste form.

The compressed gel analyzed as follows:

TABLE I.—COMPRESSED GEL

| | |
|---|---|
| $Al_2O_3$:MgO molecular ratio | 1:3.4 |
| $Cl^-$ ion | 0.1% |
| $Na^+$ ion | <0.07% |
| $CO_2$ | 1.6% |

SUSPENSION OF COMPRESSED GEL IN $H_2O$

| | |
|---|---|
| pH | 8.0. |
| Acid consuming capacity | 23.4 cc. N/10 HCl/g. of suspension. |
| $Al_2O_3$ equivalent in suspension | [1] 1.7%. |
| MgO equivalent in suspension | [1] 2.3%. |

[1] 4% based on total oxides.

It was found that these characteristics were not appreciably affected and that the gel did not thicken or harden upon prolonged storage.

488 g. of the compressed gel was air-dried at 45° C. for 21.5 hours, to a constant weight of 116 g. The product was pulverized through a 0.02 inch herringbone screen to give a soft white powder. This powder was analyzed, and the resulting data is tabulated below:

TABLE II

| | |
|---|---|
| $Al_2O_3$:MgO molecular ratio | 1:3.43. |
| $Al_2O_3$ equivalent in powder | 22.6%. |
| MgO equivalent in powder | 30.5%. |
| $Cl^-$ ion | 1.4%. |
| $Na^+$ ion | 0.03%. |
| Acid consuming capacity | 269 cc. N/10 HCl/g. of powder. |
| $CO_2$ | 6.4%. |
| pH (4% $Al_2O_3$ resuspension) | 7.8. |

It was found that these characteristics were not altered even after prolonged storage.

Another portion of compressed gel was slurried in water and spray-dried in a commercial 18-foot flat-bottom spray dryer at 650° F. inlet temperature and 200° F. outlet temperature. A soft white powder was obtained, which analyzed as follows:

TABLE III

| | |
|---|---|
| $Al_2O_3$:MgO molecular ratio | 1:3.63. |
| $Al_2O_3$ equivalent | 22.3%. |
| MgO equivalent | 32.3%. |
| pH (4% $Al_2O_3$ resuspension) | 8.2. |
| $Cl^-$ ion | 1.5%. |
| $Na^+$ ion | 0.035%. |
| Acid consuming capacity | 271 cc. N/10 HCl/g. of powder. |

The Holbert, Noble and Grote test results for these antacids appear in Table IV.

TABLE IV

| | pH of Artificial Gastric Juice | | | | | |
|---|---|---|---|---|---|---|
| | H₂O Suspension of Compressed Gel | | Dried Gel | | Spray-dried Gel | |
| | 5 cc. | 10 cc. | 0.445 g. | 0.89 g. | 0.5 g. | 1 g. |
| Example No. | 1 | 2 | 3 | 4 | 5 | 6 |
| Time (Minutes): | | | | | | |
| 0 | 1.5 | 1.5 | 1.5 | 1.5 | 1.5 | 1.5 |
| ¼ | <2.0 | 2.1 | 2.0 | 2.1 | 2.0 | 2.5 |
| ½ | 2.0 | 2.3 | 2.0 | 2.4 | 2.0 | 3.5 |
| 1 | 2.0 | 2.8 | 2.0 | 3.0 | 2.3 | 3.9 |
| 2 | 2.4 | 3.9 | 2.3 | 3.9 | 3.5 | 4.0 |
| 3 | 3.5 | 4.0 | 2.7 | 4.0 | 3.9 | 4.0 |
| 4 | 3.9 | 4.0 | 3.7 | 4.1 | 4.0 | 4.0 |
| 5 | 3.9 | 4.0 | 3.9 | 4.1 | 4.0 | 4.1 |
| 6 | 3.9 | 4.0 | 3.9 | 4.1 | 4.0 | 4.1 |
| 7 | 3.9 | 4.0 | 3.9 | 4.1 | 4.0 | 4.1 |
| 8 | 3.9 | 4.0 | 3.9 | 4.1 | 4.0 | 4.1 |
| 9 | 4.0 | 4.1 | 3.9 | 4.1 | 4.0 | 4.1 |
| 10 | 4.0 | 4.1 | 3.9 | 4.1 | 4.0 | 4.1 |
| 20 | 3.7 | 4.0 | 3.7 | 4.0 | 3.8 | 4.1 |
| 30 | 3.7 | 3.9 | 3.7 | 3.9 | 3.8 | 4.0 |
| 40 | 3.7 | 3.9 | 3.7 | 3.9 | 3.8 | 3.9 |
| 50 | 3.6 | 3.8 | 3.6 | 3.8 | 3.7 | 3.9 |
| 60 | 3.5 | 3.8 | 3.5 | 3.8 | 3.7 | 3.8 |
| 70 | 3.4 | 3.8 | 3.4 | 3.7 | 3.6 | 3.8 |
| 80 | 3.2 | 3.7 | 3.2 | 3.7 | 3.5 | 3.8 |
| 90 | 2.9 | 3.7 | 2.9 | 3.6 | 3.4 | 3.7 |
| 100 | 2.5 | 3.6 | 2.6 | 3.6 | 3.1 | 3.7 |
| 110 | 2.3 | 3.5 | 2.3 | 3.5 | 2.6 | 3.7 |
| 120 | 2.1 | 3.4 | | 3.4 | 2.3 | 3.6 |
| 130 | | 3.3 | | 3.3 | 2.1 | 3.5 |
| 140 | | 3.0 | | 3.1 | | 3.5 |
| 150 | | 2.6 | | 2.8 | | 3.3 |
| 160 | | 2.3 | | 2.5 | | 2.8 |
| 170 | | 2.1 | | 2.3 | | 2.4 |
| 180 | | | | 2.2 | | |

The data show that antacid compositions prepared in accordance with this invention are capable of maintaining a pH within the range of from 3 to 5 for a period of from 84 to 142 minutes. The time initially required to reach a pH of between 3 and 5 was at most 4 minutes, and less than 2 minutes for four of the six samples of the antacids of the invention. The antacids even in large dosages did not increase the initial pH to above 4.5.

Equivalent antacid dosages yield equivalent neutralizing results, irrespective of whether a wet form of the antacid slurry or a resuspension of its dried powder is used. The antacids can thus be administered with equal effectiveness in wet or dry form.

The spray dried antacid composition of Examples 5 and 6 was capable of maintaining a pH within the range of from 3 to 5 for a period of about 100 to over 150 minutes.

For comparison with these antacids of the invention, several mixed aluminum hydroxide-magnesium hydroxide and aluminum hydroxy carbonate-magnesium carbonate slurries were prepared by mixing weighed quantities of the two gels in a measured amount of deionized water. The mixtures were agitated at 1000 r.p.m. in a Lightnin' mixer for one hour, and were then homogenized through a hand model homogenizer.

Three $Al(OH)_3$—$Mg(OH)_2$ compositions were prepared, using commercially available materials, as follows:

(A) 110.5 g. of a thick reactive suspension of aluminum hydroxide compressed gel was mixed with 72 g. of magnesium hydroxide wet paste and slurried in 418 g. of deionized water.

(B) 108.2 g. of a thin suspension of a reactive aluminum hydroxide compressed gel was mixed with 72 g. of magnesium hydroxide wet paste and slurried in 420 g. of deionized water.

(C) 80.8 g. of a highly concentrated aluminum hydroxide gel having a somewhat lower reactivity than the above aluminum hydroxide compressed gel was mixed with 72 g. of magnesium hydroxide wet paste and slurried in 447 g. of deionized water.

Analysis of the above three suspensions indicated an $Al_2O_3$ content of 1.86%, an MgO content of 2.5% and an $Al_2O_3$:MgO molecular ratio of 1:3.4 in each instance. The pH of the slurry of Sample A was 8.15, of Sample B 8.5, and of Sample C 8. The acid consuming capacity of these was 23.5, 24.5 and 22.8 cc. N/10 Hcl/g. per g. of suspension, respectively.

The antacid effectiveness of the above three suspensions was determined for a 10 cc. dose and is tabulated in Table VI, together with the comparable Example No. 2.

(D) An aluminum hydroxide suspension was prepared as follows:

226.8 g. of sodium aluminate was dissolved in 2000 g. of deionized water, and carbon dioxide gas was bubbled through the solution at a rate of 10 cu. ft. per hour until a pH of 7.35 was reached. The slurry was then aged for one hour, filtered, and washed, to yield 296.7 g. of compressed gel containing 34.4% of $Al_2O_3$ by weight. A 1.86% $Al_2O_3$ suspension was made from the above which had a pH of 7.55 and an acid consuming capacity of 0.5 cc. N/10 HCl/g. of suspension.

The antacid effectivness of the above suspension was tested and tabulated in Table VI under D, 10 cc. dose.

(E) 65.8 g. of this compressed gel was mixed with 146 g. magnesium hydroxide and then slurried with 1006 g. of deionized water. This mixture was agitated for one hour in a Lightnin' mixer at 1000 r.p.m., and homogenized. Analysis of this mixed gel indicated:

TABLE V

| | |
|---|---|
| $Al_2O_3$:MgO molecular ratio | 1:3.4. |
| $Al_2O_3$ content of suspension | 1.86%. |
| MgO content of suspension | 2.50%. |
| pH | 9.5. |
| Acid consuming capacity | 13.9 cc. N/10 HCl/g. of suspension. |

The antacid effectiveness was determined, and appears in Table VI as E, 10 cc. dose.

TABLE VI

| Time (Minutes) | pH of Artificial Gastric Juice | | | | | |
|---|---|---|---|---|---|---|
| | Example No. 2 | A | B | C | D | E |
| 0 | 1.5 | 1.5 | 1.5 | 1.5 | 1.5 | 1.5 |
| ¼ | 2.1 | 1.8 | 4.4 | 2.6 | <2 | 2.6 |
| ½ | 2.3 | 3.0 | 4.8 | 4.1 | <2 | 5.0 |
| 1 | 2.8 | 4.7 | 5.7 | 4.4 | <2 | 5.9 |
| 2 | 3.9 | 5.2 | 6.8 | 4.6 | <2 | 6.4 |
| 3 | 4.0 | 5.9 | 7.2 | 4.8 | <2 | 6.6 |
| 4 | 4.0 | 6.0 | 7.4 | 4.9 | <2 | 6.7 |
| 5 | 4.0 | 6.0 | 7.5 | 5.1 | <2 | 6.8 |
| 6 | 4.0 | 6.1 | 7.5 | 5.2 | <2 | 6.9 |
| 7 | 4.0 | 6.1 | 7.6 | 5.4 | <2 | 7.0 |
| 8 | 4.0 | 6.1 | 7.6 | 5.5 | <2 | 7.0 |
| 9 | 4.1 | 6.1 | 7.6 | 5.6 | <2 | 7.1 |
| 10 | 4.1 | 6.1 | 7.6 | 5.8 | <2 | 7.1 |
| 20 | 4.0 | 5.3 | 7.2 | 5.7 | <2 | 5.8 |
| 30 | 3.9 | 5.0 | 6.8 | 5.4 | <2 | 5.8 |
| 40 | 3.9 | 5.0 | 6.5 | 4.9 | <2 | 5.7 |
| 50 | 3.8 | 4.9 | 6.2 | 4.5 | <2 | 5.7 |
| 60 | 3.8 | 4.8 | 5.8 | 4.2 | <2 | 5.6 |
| 70 | 3.8 | 4.7 | 5.2 | 4.1 | <2 | 5.4 |
| 80 | 3.7 | 4.6 | 4.6 | 4.1 | <2 | 5.3 |
| 90 | 3.7 | 4.5 | 4.3 | 4.0 | <2 | 4.8 |
| 100 | 3.6 | 4.3 | 4.1 | 4.0 | <2 | 3.2 |
| 110 | 3.5 | 3.5 | 3.9 | 3.8 | <2 | 2.8 |
| 120 | 3.4 | 2.7 | 3.1 | 3.2 | <2 | 2.5 |
| 130 | 3.3 | 2.5 | | | | |
| 140 | 3.0 | | | | | |

The data appearing in Table VI is graphed in FIGURE 1.

A comparison of the acid neutralizing characteristics of the above prepared mixed gels of the prior art with Example No. 2 indicates that the mixed gels, A, B, C and E tend to "overneutralize." D never brought the pH above 2. All failed to maintain the pH of the artificial gastric juice within the desired range for as long a period of time as does the antacid of this invention.

A portion of each of the slurries of Samples Nos. A, B and C was air dried at 45° C. in an air circulating oven for 32, 27.5 and 23.5 hours, respectively, and pulverized, using a 0.02 inch herringbone screen, to yield a soft white powder.

The antacid effectiveness of the three powders was determined, using a 1 g. dose, and the results tabulated below in comparison with the comparable Example 4.

65.8 g. of the compressed gel of E was mixed with 146 g. of magnesium hydroxide and slurred with 1006 g. of deionized water. This mixture was then agitated for one hour at 1000 r.p.m., using a Lightnin' mixer. 680.6 g. of this slurry was dried at 45° C. in an air-circulating oven for 27.5 hours, yielding a cake which was pulverized through a 0.02 inch herringbone screen to 49.6 g. of a white powder.

The antacid effectiveness of the dried powder was determined and is tabulated in Table VII under E, 1 g. dose.

TABLE VII

| Time (Minutes) | pH of Artificial Gastric Juice | | | | |
|---|---|---|---|---|---|
| | Example No. 4 | A | B | C | E |
| 0 | 1.5 | 1.5 | 1.5 | 1.5 | 1.5 |
| ¼ | 2.1 | 2.1 | 2.2 | 2.2 | 3.5 |
| ½ | 2.4 | 2.3 | 2.8 | 3.0 | 5.1 |
| 1 | 3.0 | 3.7 | 4.3 | 4.6 | 6.0 |
| 2 | 3.9 | 4.7 | 4.7 | 5.0 | 6.5 |
| 3 | 4.0 | 5.0 | 5.0 | 5.2 | 6.7 |
| 4 | 4.1 | 5.2 | 5.3 | 5.3 | 6.9 |
| 5 | 4.1 | 5.4 | 5.5 | 5.5 | 7.0 |
| 6 | 4.1 | 5.5 | 5.6 | 5.5 | 7.0 |
| 7 | 4.1 | 5.6 | 5.7 | 5.6 | 7.1 |
| 8 | 4.1 | 5.7 | 5.8 | 5.6 | 7.1 |
| 9 | 4.1 | 5.8 | 5.8 | 5.7 | 7.2 |
| 10 | 4.1 | 5.8 | 5.9 | 5.7 | 7.2 |
| 20 | 4.0 | 5.0 | 5.0 | 4.9 | 6.0 |
| 30 | 3.9 | 5.0 | 5.9 | 4.8 | 5.8 |
| 40 | 3.9 | 4.9 | 4.7 | 4.7 | 5.7 |
| 50 | 3.8 | 4.8 | 4.6 | 4.4 | 5.6 |
| 60 | 3.8 | 4.6 | 4.5 | 4.3 | 5.4 |
| 70 | 3.7 | 4.5 | 4.4 | 4.1 | 5.0 |
| 80 | 3.7 | 4.3 | 4.3 | 3.9 | 4.4 |
| 90 | 3.6 | 4.2 | 4.2 | 3.6 | 3.7 |
| 100 | 3.6 | 4.1 | 4.1 | 3.6 | 3.5 |
| 110 | 3.5 | 3.9 | 3.9 | 3.8 | 3.4 |
| 120 | 3.4 | 3.7 | 3.6 | 3.6 | 3.1 |
| 130 | 3.3 | 3.5 | 3.3 | 3.4 | 3.0 |
| 140 | 3.1 | 3.2 | 3.0 | 3.1 | 3.9 |
| 150 | 2.8 | 3.0 | 2.8 | 2.8 | 2.9 |
| 160 | 2.5 | 2.7 | 2.6 | 2.6 | 2.8 |

Figure 2:
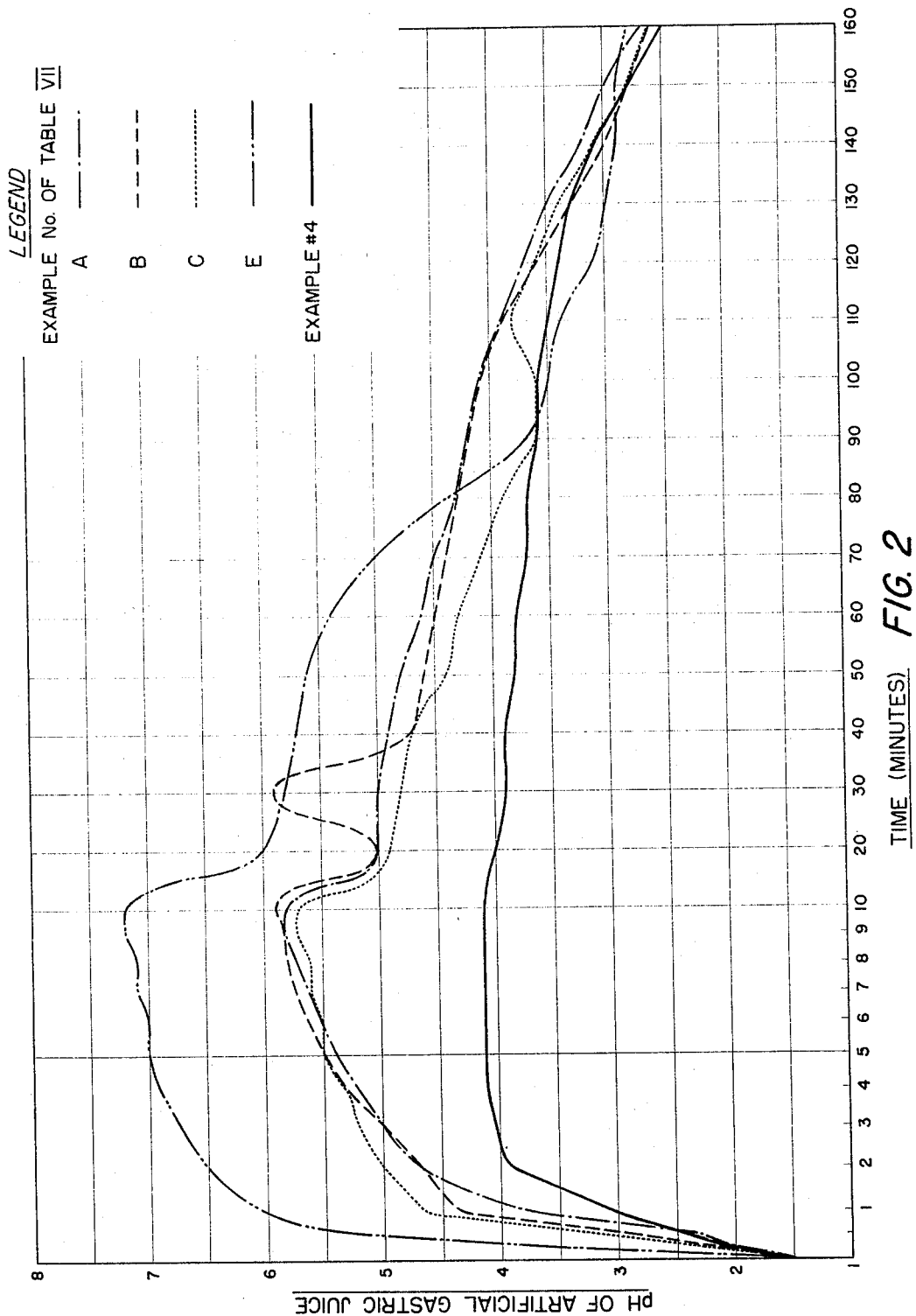

The data of Table VII is graphed in FIGURE 2.

The above data indicates that the dried powder made from the mixed gels tended to "overneutralize," rising above 5 for one-half hour, and maintained the pH within the desired range only for the last two hours of the 160 minute test period.

This indicates that the antacid powders prepared in accordance with this invention are substantially different from mere mixed gels, in that the undesirable "overneutralizing" characteristics of magnesium hydroxide is effectively masked in the antacids of this invention.

*Example 7*

226.8 g. of sodium aluminate was dissolved in 2000 g. of deionized water mixed with 990 g. of 50% sodium hydroxide solution. 1550 g. of magnesium chloride hexahydrate was dissolved in 3000 g. of deionized water. These solutions were simultaneously added to 4500 g. of deionized water at room temperature over fifty-eight minutes, at such a rate and in such proportions to maintain the pH between 9.5 and 10. A gelatinous white precipitate formed. After the last portions of the solutions were added, the slurry was aged for one hour, during which time the pH increased to 11.2. The pH was adjusted to 7.4 by bubbling 639 g. of carbon dioxide gas through the slurry for 100 minutes. The slurry was then aged for one hour, after which it was filtered, and the filter cake washed with deionized water. 2450 g. of compressed gel was obtained, in paste form. A water suspension was made from the above compressed gell, to correspond to an approximate 1.8% $Al_2O_3$, 4.2% MgO, content. This suspension analyzed as follows:

TABLE VIII

| | |
|---|---|
| $Al_2O_3$:MgO molecular ratio | 1:5.9 |
| $Al_2O_3$ equivalent in suspension | 1.8% |
| MgO equivalent in suspension | 4.2% |
| pH | 8.8 |
| $Cl^-$ ion | 0.07% |
| $Na^+$ ion | <0.07% |
| Acid consuming capacity | 31.1 cc. N/10 HCl/g. of suspension |
| $CO_2$ | 2.2% (in compressed gel) |

A 491.8 g. sample of the compressed gel was air-dried at 45° C. for 23 hours to a constant weight of 147 g. which was pulverized through a 0.02 inch herringbone screen to a soft white powder. This powder analyzed as below:

TABLE IX

| | |
|---|---|
| $Al_2O_3$:MgO molecular ratio | 1:5.9 |
| $Al_2O_3$ equivalent, percent | 13.8 |
| MgO equivalent, percent | 32.1 |
| $Cl^-$ ion, percent | 0.5 |
| $Na^+$ ion, percent | <0.07 |
| $CO_2$, percent | 7.35 |

The antacid characteristics of the powder were determined to be as follows:

TABLE X

| Time (Minutes) | pH of Artificial Gastric Juice | |
|---|---|---|
| | 0.5 g. | 1.0 g. |
| 0 | 1.5 | 1.5 |
| ¼ | 2.6 | 4.1 |
| ½ | 4.0 | 4:3 |
| 1 | 4.2 | 4.4 |
| 2 | 4.2 | 4.5 |
| 3 | 4.2 | 4.6 |
| 4 | 4.2 | 4.7 |
| 5 | 4.2 | 4.8 |
| 6 | 4.3 | 4.9 |
| 7 | 4.3 | 5.0 |
| 8 | 4.3 | 5.1 |
| 9 | 4.3 | 5.2 |
| 10 | 4.3 | 5.3 |
| 20 | 4.0 | 4.9 |
| 30 | 4.0 | 4.6 |
| 40 | 3.9 | 4.3 |
| 50 | 3.8 | 4.1 |
| 60 | 3.7 | 4.1 |
| 70 | 3.4 | 4.0 |
| 80 | 3.1 | 3.9 |
| 90 | 2.8 | 3.9 |
| 100 | 2.6 | 3.8 |
| 110 | 2.4 | 3.6 |
| 120 | 2.2 | 3.5 |
| 130 | | 3.3 |
| 140 | | 3.0 |
| 150 | | 2.7 |
| 160 | | 2.5 |
| 170 | | 2.3 |

This antacid was capable of maintaining a pH within the range of from 3 to 5 for a period of from 79 to 137 minutes of the test period. The time required to reach a pH within this range was only 10 seconds or 19 seconds. The antacid of this example did not seriously "overneutralize," although the $Al_2O_3$:MgO ratio was very high. The pH exceeded 5 only for a period of three minutes.

*Example 8*

226.8 g. of sodium aluminate was dissolved in 4700 g. of deionized water containing 607 g. of sodium carbonate.

856 g. of magnesium chloride hexahydrate was dissolved in 2000 g. of deionized water. The two solutions were added to 5500 g. of deionized water during a period of eighty minutes, at a rate and in proportions to maintain the pH at between 9.5 and 10. The pH at the end of the addition was 9.5. The slurry was then aged for one hour, during which time the pH decreased to 9.45. Thereafter, 180 g. of carbon dioxide gas was bubbled through for sixty minutes, after which the pH was 8.5, and the slurry was then aged for two hours. The slurry was filtered, and the filter cake washed with deionized water. 1900 g. of compressed gel was obtained.

A water suspension of the above compressed gel was prepared to an approximate 1.8% $Al_2O_3$ content. This suspension analyzed as follows:

TABLE XI

| | |
|---|---|
| $Al_2O_3$:MgO molecular ratio | 1:4.05. |
| $Al_2O_3$ content of suspension | 1.87%. |
| MgO content of suspension | 3.00%. |
| pH | 7.95. |
| $Cl^-$ ion | 0.01%. |
| $Na^+$ ion | 0.07%. |
| Acid neutralizing capacity | 24.7 cc. N/10 HCl/g. of suspension. |
| $CO_2$ | 4.88% (in compressed gel). |

The antacid effectiveness was determined to be as tabulated below:

TABLE XII

| Time (minutes): | pH of artificial gastric juice, 5 cc. dose |
|---|---|
| 0 | 1.5 |
| ¼ | 3.7 |
| ½ | 3.9 |
| 1 | 4.1 |
| 2 | 4.3 |
| 3 | 4.3 |
| 4 | 4.3 |
| 5 | 4.4 |
| 6 | 4.4 |
| 7 | 4.4 |
| 8 | 4.4 |
| 9 | 4.4 |
| 10 | 4.5 |
| 20 | 4.2 |
| 30 | 4.1 |
| 40 | 4.0 |
| 50 | 3.9 |
| 60 | 3.8 |
| 70 | 3.7 |
| 80 | 3.5 |
| 90 | 3.2 |
| 100 | 2.9 |
| 110 | 2.6 |
| 120 | 2.3 |
| 130 | 2.1 |

The antacid increased the pH of the artificial gastric juice to 3.0 within ten seconds after it was added. However, this antacid did not "overneutralize" the gastric acidity, which was never increased above pH 4.4. The gastric acidity was maintained within the desired range of from 3 to 5 for 90 minutes.

Example 9

An aluminum-magnesium-calcium-hydroxy-carbonate antacid was prepared in accordance with this invention in the following manner:

226.8 g. of sodium aluminate was dissolved in 2000 g. of deionized water, to which 440 g. of 50% sodium hydroxide solution had been added. 856 g. of magnesium chloride hexahydrate and 1180 g. of calcium chloride hexahydrate were dissolved in 2000 g. of deionized water. These solutions were added together to 5500 g. of deionized water over a period of 67 minutes at a rate and in proportions to maintain the pH between 9.5 and 10. At the end of the addition the pH was 9.8, after which the slurry was aged for 60 minutes, during which time the pH increased to 10.05. The pH of the aged slurry was then adjusted to 6.0 by bubbling 297 g. of carbon dioxide gas through the slurry during a period of 63 minutes. The slurry was aged for two hours, filtered, and the filter cake washed with deionized water. 2482 g. of compressed gel was obtained. A water suspension thereof analyzed as follows:

TABLE XIII

| | |
|---|---|
| $Al_2O_3$:MgO molecular ratio | 1:3.56. |
| $Al_2O_3$:CaO molecular ratio | 1:0.61. |
| $Al_2O_3$ equivalent in suspension | 1.9%. |
| MgO equivalent in suspension | 2.68%. |
| CaO equivalent in suspension | 0.64%. |
| pH | 8.95. |
| $Cl^-$ ion | 0.1%. |
| $Na^+$ ion | <0.07%. |
| Acid consuming capacity | 25.3 cc. N/10 HCl/g. of suspension. |
| $CO_2$ | 2.2% (in compressed gel). |

474.9 g. of the compressed gel was air dried at 45° C. for nineteen hours to a constant weight of 102.9 g. When pulverized through a 0.02 inch herringbone screen, this yielded to soft white powder analyzed as follows:

TABLE XIV

| | |
|---|---|
| $Al_2O_3$:MgO molecular ratio | 1:3.54 |
| $Al_2O_3$:CaO molecular ratio | 1:0.62 |
| $Al_2O_3$ content of powder, percent | 19.5 |
| MgO content of powder, percent | 27.4 |
| CaO content of powder, percent | 6.55 |
| pH (4% $Al_2O_3$ resuspension) | 8.95 |
| $Cl^-$ ion, percent | 1.33 |
| $Na^+$ ion, percent | <0.07 |
| $CO_2$, percent | 10.3 |

The antacid effectiveness was determined and the results tabulated in Table XV.

TABLE XV

| Time (Minutes) | pH of Artificial Gastric Juice | | | |
|---|---|---|---|---|
| | Suspension in $H_2O$ | | Dried Gel | |
| | 5 cc. | 10 cc. | 0.5 g. | 1 g. |
| 0 | 1.5 | 1.5 | 1.5 | 1.5 |
| ¼ | 2.0 | 3.9 | 2.1 | 2.5 |
| ½ | 2.2 | 4.1 | 2.3 | 3.0 |
| 1 | 2.8 | 4.2 | 2.6 | 4.1 |
| 2 | 4.0 | 4.3 | 3.9 | 4.3 |
| 3 | 4.0 | 4.4 | 4.1 | 4.4 |
| 4 | 4.0 | 4.5 | 4.1 | 4.4 |
| 5 | 4.0 | 4.5 | 4.1 | 4.5 |
| 6 | 4.1 | 4.6 | 4.2 | 4.5 |
| 7 | 4.1 | 4.7 | 4.2 | 4.6 |
| 8 | 4.1 | 4.7 | 4.2 | 4.6 |
| 9 | 4.1 | 4.8 | 4.2 | 4.7 |
| 10 | 4.1 | 4.8 | 4.2 | 4.7 |
| 20 | 3.9 | 4.6 | 3.9 | 4.5 |
| 30 | 3.8 | 4.4 | 3.9 | 4.4 |
| 40 | 3.8 | 4.2 | 3.9 | 4.2 |
| 50 | 3.7 | 4.1 | 3.7 | 4.1 |
| 60 | 3.7 | 3.9 | 3.6 | 4.0 |
| 70 | 3.6 | 3.9 | 3.5 | 3.9 |
| 80 | 3.4 | 3.8 | 3.3 | 3.9 |
| 90 | 3.2 | 3.8 | 3.1 | 3.8 |
| 100 | | 3.7 | | 3.8 |
| 110 | | 3.7 | | 3.7 |
| 120 | | 3.7 | | 3.7 |
| 130 | | 3.6 | | 3.6 |
| 140 | | 3.5 | | 3.6 |
| 150 | | 3.4 | | 3.5 |
| 160 | | 3.2 | | 3.5 |
| 170 | | | | 3.4 |
| 180 | | | | 3.3 |
| 190 | | | | 3.3 |
| 200 | | | | 3.1 |
| | | | | 3.0 |

This antacid effectively maintains the pH of artificial gastric juices between 3 and 5 for up to 200 minutes. The antacid in the form of a stable dry powder had a particularly high and sustained antacid activity. The pH of the artificial gastric juices was brought to between 3 and 5 within half a minute after the addition of the antacid, and kept there for 200 minutes, and the pH was maintained within the preferred range of from 3.5 to 4.5 for 145 minutes of the test run. Although this antacid had a rapid and prolonged effectiveness, it did not "overneutralize" the normal stomach acidity.

Example 10

113.4 g. of sodium aluminate was dissolved in 195 g. of 50% sodium hydroxide solution and 1000 g. of deionized water. 32 g. of magnesium chloride hexahydrate was dissolved in 75 g. of deionized water. These two solutions were simultaneously added to 2750 g. of deionized water, at a rate of addition and in proportions to maintain the pH between 9.5 and 10.

After the whole of the aluminate solution had been added there was still a substantial quantity of the magnesium chloride solution remaining. In order to continue to maintain the pH between 9.5 and 10, the remaining portion of aluminate solution was added while carbon dioxide gas was bubbled through the solution at a rate of 2 cu. ft. per hour. The end pH was 10.1.

The slurry was then aged, during which time the pH increased to 10.4. 280 g. of carbon dioxide gas was used to adjust the pH to 7.7 in one hour, after which the slurry was aged for two hours, filtered, and the filter cake washed. An aqueous suspension made from the compressed gel analyzed as follows:

TABLE XVI $Al_2O_3$:MgO molecular ratio _____ 3.29:1.
$Al_2O_3$ content of suspension _____ 3.99%.
MgO content of suspension _____ 0.48%.
pH _____ 7.85.
$Cl^-$ ion _____ 0.01%.
$Na^+$ ion _____ <0.07%.
Acid consuming capacity _____ 19.45 cc. N/10 HCl/g. of suspension.
$CO_2$ _____ 5.28% (in compressed gel).

The antacid characteristics of the above composition were determined. The antacid maintained the pH of artificial gastric juices within the desired range of 3 to 5 for more than one hour, without "overneutralizing."

Example 11

An aluminum-calcium-hydroxy-carbonate was prepared from a solution of 113.4 g. of sodium aluminate dissolved in 1500 g. of deionized water, mixed with 198.5 g. of sodium carbonate, and a solution of 590 g. of calcium chloride hexahydrate in 1000 g. of deionized water. These two solutions were added together to 2250 g. of water over a period of 53 minutes while maintaining the pH at between 9.5 and 10. Upon aging for one hour, the pH increased to 10.15, whereupon 460 g. of carbon dioxide gas was bubbled through the slurry to adjust the pH to 5.3 in one hour. The slurry was then aged for an additional two hours, filtered, and the filter cake washed with deionized water. 1108 g. of compressed gel was obtained.

A aqueous suspension made from the above compressed gel analyzed as follows:

TABLE XVII $Al_2O_3$:CaO molecular ratio _____ 1:4.86.
$Al_2O_3$ content _____ 1.81%.
CaO content _____ 4.84%.
pH _____ 7.8.
$Cl^-$ ion _____ 0.003%.
$Na^+$ ion _____ 0.025%.
Acid neutralizing capacity _____ 19.7 cc. N/10 HCl/g. of suspension.
$CO_2$ _____ 9.8% (in compressed gel).

The aluminum-calcium-hydroxy-carbonate antacid maintained the pH of the artificial gastric juices within a range of from 3 to 5 for two hours without "overneutralizing."

Example 12

An aluminum-magnesium-hydroxy-carbonate of this invention was prepared by dissolving 56.8 g. of sodium aluminate in 500 g. of deionized water mixed with 97.5 g. of 50% sodium hydroxide solution, dissolving 214 g. of magnesium chloride hexahydrate in 500 g. of deionized water, heating these solutions to 65° C., and then simultaneously adding these solutions to 1375 g. of deionized water also at 65° C., at such a rate and in such proportions as to maintain the pH between 9.5 and 10, and the temperature at 62 to 65° C. One hour was required to complete the reaction. At the completion of the simultaneous addition, the pH was 9.65, and a gelatinous white precipitate had formed.

The slurry was brought to room temperature and aged for one hour, under continuous agitation. 467 g. of carbon dioxide gas was then bubbled through the slurry under continued agitation at room temperature for sixty minutes, during which the pH decreased to 8.0.

The slurry was allowed to age for about two hours, filtered, and the filter cake repeatedly washed with deionized water to remove sodium and chloride ions. 651 g. of compressed gel was obtained in paste form.

A stable aqueous suspension was made from the compressed gel to an approximate 1.8% $Al_2O_3$ content:

TABLE XVIII.—SUSPENSION OF COMPRESSED GEL IN $H_2O$ $Al_2O_3$ _____ 1.79%.
MgO _____ 2.38%.
$Al_2O_3$:MgO molecular ratio _____ 1:3.37.
$Cl^-$ ion _____ 0.017%.
$Na^+$ ion _____ 0.07%.
pH _____ 8.2.
Acid consuming capacity _____ 22.1 cc. N/10 HCl/g. of suspension.
$CO_2$ _____ 0.8%.

It was found that these characteristics were not appreciably affected upon prolonged storage.

357.8 g. of the compressed gel was air-dried at 45° C. for 22.5 hours, to a constant weight of 58.7 g. The product was pulverized through a 0.02 inch herringbone screen to give a soft white powder. This powder was analyzed, and the resulting data is tabulated below:

TABLE XIX $Al_2O_3$:MgO molecular ratio _____ 1:3.37.
$Al_2O_3$ equivalent in powder _____ 23.5%.
MgO _____ 31.2%.
$Cl^-$ ion _____ 0.2%.
$Na^+$ ion _____ <0.07%.
Acid consuming capacity _____ 290 cc. N/10 HCl/g. of powder.
$CO_2$ _____ 10%.
pH (4% $Al_2O_3$ resuspension) ___ 7.6.

It was found that these characteristics were not altered even after prolonged storage.

The Holbert, Noble and Grote test results for these antacids appear in Table XX.

TABLE XX

| Time (Minutes) | pH of Artificial Gastric Juice | |
|---|---|---|
| | H₂O Suspension of Compressed Gel | Dried Gel |
| | 10 cc. | 1 g. |
| 0 | 1.5 | 1.5 |
| ¼ | 2.1 | 2.1 |
| ½ | 2.4 | 2.2 |
| 1 | 2.8 | 2.45 |
| 2 | 3.9 | 3.0 |
| 3 | 4.0 | 4.0 |
| 4 | 4.1 | 4.2 |
| 5 | 4.1 | 4.25 |
| 6 | 4.1 | 4.25 |
| 7 | 4.1 | 4.25 |
| 8 | 4.15 | 4.3 |
| 9 | 4.15 | 4.35 |
| 10 | 4.15 | 4.35 |
| 20 | 4.15 | 4.2 |
| 30 | 4.0 | 4.1 |
| 40 | 4.0 | 4.0 |
| 50 | 3.45 | 3.9 |
| 60 | 3.9 | 3.85 |
| 70 | 3.85 | 3.8 |
| 80 | 3.85 | 3.7 |
| 90 | 3.8 | 3.7 |
| 100 | 3.75 | 3.65 |
| 110 | 3.7 | 3.6 |
| 120 | 3.6 | 3.5 |
| 130 | 3.4 | 3.45 |
| 140 | 3.2 | 3.35 |
| 150 | 2.8 | 3.3 |
| 160 | 2.6 | 3.25 |
| 170 | | 3.15 |
| 180 | | 3.0 |

The data show that these antacid compositions are capable of maintaining a pH within the range of from 3 to 5 for a period of from 150 to 180 minutes. The time initially required to reach a pH of between 3 and 5 was at most 2 minutes. The antacids even in large dosages did not increase the initial pH to above 4.35.

The antacid dosages yielded equivalent neutralizing results, irrespective of whether a wet form of the antacid slurry or a resuspension of its dried powder was used. The antacids can thus be administered with equal effectiveness in wet or dry form.

*Example 13*

75.6 g. of sodium aluminate was dissolved in 667 g. of deionized water with 152.3 g. of sodium hydroxide pellets. 285.3 g. of magnesium chloride hexahydrate was dissolved in 667 g. of deionized water. These solutions were heated to 65° C., and simultaneously added to 1500 g. of deionized water also at 65° C. with 82.1 g. of carbon dioxide gas, at such a rate and in such proportions to maintain the pH between 9.0 and 10, over 45 minutes, while maintaining the temperature between 65 and 70° C. A gelatinous white precipitate formed. After the last portions of the solutions were added, the slurry was brought to 25° C., in ten minutes, filtered, and the filter cake washed with deionized water. 649 g. of compressed gel was obtained, in paste form. A stable water suspension was made from the above compressed gel, to correspond to an approxiamte 1.8% Al₂O₃ content. This suspension analyzed as follows:

TABLE XXI

Al₂O₃:MgO molecular ratio __ 1:3.94.
Al₂O₃ equivalent in suspension _____ 2.03%.
MgO equivalent in suspension _____ 3.16%.
pH _____ 8.7.
Cl⁻ ion _____ 0.008%.
Na⁺ ion _____ 0.002%.
Acid consuming capacity ____ 27.3 cc. N/10 HCl/g. of suspension.
CO₂ _____ 0.78% (in compressed gel).

100 g. of the compressed gel was air-dried at 45° C. for 6.75 hours to a constant weight of 26.4 g. which was pulverized through a 0.02 inch herringbone screen to a soft white powder. This powder analyzed as below:

TABLE XXII

Al₂O₃:MgO molecular ratio _____ 1:3.94.
Al₂O₃ equivalent _____ 21.8%.
MgO equivalent _____ 34.0%.
Cl⁻ ion _____ 0.04%.
Na⁺ ion _____ 0.02%.
CO₂ _____ 8.4%.
Acid consuming capacity _____ 283 cc. N/10 HCl/g.
pH (4% Al₂O₃ slurry) _____ 8.0.

The antacid characteristics of the gel and powder were determined to be as follows:

TABLE XXIII

| Time (Minutes) | pH of Artificial Gastric Juice | |
|---|---|---|
| | H₂O Suspension of Compressed Gel | Dried Gel |
| | 10 cc. | 1 g. |
| 0 | 1.8 | 1.8 |
| ¼ | 3.4 | 2.7 |
| ½ | 4.2 | 4.0 |
| 1 | 4.25 | 4.3 |
| 2 | 4.5 | 4.5 |
| 3 | 4.5 | 4.6 |
| 4 | 4.6 | 4.65 |
| 5 | 4.65 | 4.7 |
| 6 | 4.7 | 4.7 |
| 7 | 4.7 | 4.75 |
| 8 | 4.7 | 4.75 |
| 9 | 4.7 | 4.8 |
| 10 | 4.75 | 4.8 |
| 20 | 4.7 | 4.7 |
| 30 | 4.7 | 4.65 |
| 40 | 4.6 | 4.6 |
| 50 | 4.5 | 4.55 |
| 60 | 4.5 | 4.45 |
| 70 | 4.45 | 4.40 |
| 80 | 4.45 | 4.3 |
| 90 | 4.4 | 4.2 |
| 100 | 4.35 | 4.1 |
| 110 | 4.3 | 4.0 |
| 120 | 4.25 | 3.95 |
| 130 | 4.25 | 3.8 |
| 140 | 4.15 | 3.5 |
| 150 | 4.1 | 3.1 |
| 160 | 4.0 | 2.85 |
| 170 | 3.85 | 2.65 |
| 180 | 3.7 | |
| 190 | 3.3 | |
| 200 | 3.0 | |

This antacid was capable of maintaining a pH within the range of from 3 to 5 for a period of from 150 to 200 minutes. The time required to reach a pH within this range was only ¼ to ½ minute. The antacid did not "overneutralize," although the Al₂O₃:MgO ratio was very high.

The antacids of this invention have been found to be more effective than are simple mixtures of the components thereof. It is unusual and unexpected to obtain a coprecipitated gel or slurry which is more reactive than a simple mixture of its components. Magnesium hydroxide itself is characterized by a high initial pH surge, with consequent "overneutralization." This undesirable characteristic of magnesium hydroxide is masked in the antacids of this invention, while its desirable cathartic property is retained, to counteract the constipating effect of aluminum hydroxide. While the dried gel of aluminum hydroxide exhibits a lag and a reduction in its antacid activity, does not give a prolonged antacid effect, and is adversely affected by pepsin, the antacid of this invention does not exhibit any such loss in antacid activity upon drying. The antacid of this invention also retains its effectiveness upon aging. The proportion of magnesium present in the antacids of this invention can be much greater than could be explained by adsorption or absorption. Furthermore, these antacids exhibit a great resistance to occlusion of foreign ions.

The evolution of gas during the neutralizing reaction of an antacid as not desirable. Fuchs in Drug & Cosmetic Industry, 64, 692 (1949) indicates that some soluble bicarbonates release carbon dioxide gas nearly instantaneously during the neutralizing reaction, and states that this is an undesirable characteristic for an antacid. The antacids of this invention, in contradistinction to many antacids of the prior art, do not release large quantities of gas during the period of acid neutralization and buffering. The antacids of this invention have a maximum $CO_2$ content of only about 5–6% per weight of compressed gel, and the $CO_2$-complex bond is of a type which does not result in instantaneous and voluminous evolution of gas.

The antacids of this invention are stable, and retain their neutralizing and buffering effectiveness over an extended period of time, irrespective of whether stored as a wet gel or slurry, or whether kept in the form of a dry powder. Some antacids known to the art are unstable and cannot be stored as wet gels or suspensions.

We claim:

1. A process for preparing an antacid composition capable as determined by the Holbert, Noble and Grote test method of maintaining the pH of artificial gastric juice within the range from about 3 to about 5 for at least one hour, which comprises mixing an aqueous medium of (a) a solution of an alkali metal aluminate, selected from the group consisting of sodium aluminate and potassium aluminate (b) a solution of at least one water-soluble salt of calcium and magnesium, selected from the class of salts consisting of chloride, bromide, iodide and nitrate, and (c) a solution containing sufficient alkali, selected from the class consisting of sodium hydroxide, potassium hydroxide, sodium carbonate and potassium carbonate, to provide and maintain said media at a pH of from about 9 to about 10, to form a coprecipitate complex comprising aluminum, at least one member selected from the group consisting of magnesium and calcium, and hydroxide ions, and reacting the coprecipitate complex with carbon dioxide at a solution pH within the range from about 6 to about 10 whereupon a carbonated coprecipitate complex is formed having a molecular weight ratio calculated as $Al_2O_3$:MO within the range of about 4:1 to about 1:10, wherein M represents at least one member selected from the group consisting of magnesium and calcium.

2. A process in accordance with claim 1 wherein the carbon dioxide is added as carbon dioxide gas.

3. A process in accordance with claim 1 which comprises separating the carbonated coprecipitate complex from the reaction solution and washing said carbonated co-precipitate complex with water to remove soluble salts therefrom.

4. A process in accordance with claim 3 which includes drying the resulting product.

5. A process in accordance with claim 1 wherein the source of aluminum ion is an alkali metal aluminate selected from the group comprising the aluminates of sodium and potassium and mixtures thereof.

6. A process in accordance with claim 1 wherein the source of magnesium ion is a water-soluble magnesium salt selected from the group comprising the chlorides, bromides, iodides and nitrates of magnesium.

7. A process in accordance with claim 1 wherein the source of calcium ion is a water-soluble calcium salt selected from the group comprising the chlorides, bromides, iodides and nitrates of calcium.

8. A process in accordance with claim 1 which comprises blending the aqueous solution of the alkali metal aluminate with the aqueous solution of water-soluble magnesium salt by adding the two to water at a rate and in proportions to maintain the pH of the resulting mixture within the range from about 9 to about 10.

9. A process in accordance with claim 1 wherein the pH is brought to within the range from about 1 to about 10 by the addition of an alkali metal carbonate.

10. A process in accordance with claim 1 wherein the pH is brought to within the range from about 1 to about 10 by the addition of an alkali metal hydroxide.

11. A process in accordance with claim 1 which comprises aging the coprecipitate.

12. A process in accordance with claim 1 which comprises simultaneously coprecipitating the complex and reacting it with carbon dioxide.

13. A process in accordance with claim 1 which comprises coprecipitating the complex, aging the coprecipitate and then reacting the coprecipitate with carbon dioxide.

14. An antacid composition prepared according to the process of claim 1 and capable as determined by the Holbert, Noble and Grote test method of maintaining the pH of artificial gastric juice within the range from about 3 to about 5 for at least one hour, comprising at least one member of the group consisting of aluminum-magnesium-hydroxy-carbonate, aluminum-magnesium-calcium-hydroxy-carbonate, and aluminum-calcium-hydroxy-carbonate, said member having a molecular weight ratio calculated as $Al_2O_3$:MO within the range from about 4:1 to about 1:10, wherein M represents at least one member selected from the group consisting of magnesium and calcium.

15. An antacid composition in accordance with claim 14 comprising aluminum-magnesium-hydroxy-carbonate.

16. An antacid composition in accordance with claim 14 comprising aluminum-calcium-hydroxy-carbonate.

17. An antacid composition in accordance with claim 14 comprising aluminum-magnesium-calcium-hydroxy-carbonate.

18. An antacid composition in accordance with claim 14 in the form of an aqueous suspension.

19. An antacid composition in accordance with claim 14 in the form of a gel.

20. An antacid composition prepared in accordance with the process of claim 4 in the form of a dry powder.

21. An antacid tablet comprising a composition in accordance with claim 14 and an excipient.

References Cited by the Examiner

UNITED STATES PATENTS

| | | | |
|---|---|---|---|
| 2,797,978 | 7/1957 | Beekman | 167—55 |
| 2,880,136 | 3/1959 | Gore | 167—55 |
| 2,958,626 | 11/1960 | Schenck | 167—55 |
| 3,017,324 | 1/1962 | Beekman | 167—55 |
| 3,099,524 | 7/1963 | Grossmith | 167—55 |

JULIAN S. LEVITT, *Primary Examiner.*

FRANK CACCIAPAGLIA, JR., *Examiner.*

SAM ROSEN, *Assistant Examiner.*